(12) United States Patent
Chester et al.

(10) Patent No.: US 8,139,764 B2
(45) Date of Patent: Mar. 20, 2012

(54) CLOSED GALOIS FIELD CRYPTOGRAPHIC SYSTEM

(75) Inventors: David B. Chester, Palm Bay, FL (US); Alan J. Michaels, West Melbourne, FL (US)

(73) Assignee: Harris Corporation, Melbourne, FL (US)

(*) Notice: Subject to any disclaimer, the term of this patent is extended or adjusted under 35 U.S.C. 154(b) by 933 days.

(21) Appl. No.: 12/116,104

(22) Filed: May 6, 2008

(65) Prior Publication Data
US 2009/0279688 A1 Nov. 12, 2009

(51) Int. Cl.
*H04K 1/00* (2006.01)
(52) U.S. Cl. .......... 380/28; 370/326; 714/781; 708/492
(58) Field of Classification Search .................. 714/781; 380/28; 370/326; 708/492
See application file for complete search history.

(56) References Cited

U.S. PATENT DOCUMENTS

| | | |
|---|---|---|
| 3,564,223 A | 2/1971 | Harris et al. |
| 4,095,778 A | 6/1978 | Wing |
| 4,646,326 A | 2/1987 | Backof, Jr. et al. |
| 4,703,507 A | 10/1987 | Holden |
| 5,007,087 A | 4/1991 | Bernstein et al. |
| 5,048,086 A | 9/1991 | Bianco et al. |
| 5,077,793 A | 12/1991 | Falk et al. |
| 5,276,633 A | 1/1994 | Fox et al. |
| 5,297,153 A | 3/1994 | Baggen et al. |
| 5,297,206 A | 3/1994 | Orton |
| 5,319,735 A | 6/1994 | Preuss et al. |
| 5,412,687 A | 5/1995 | Sutton et al. |
| 5,598,476 A | 1/1997 | LaBarre et al. |
| 5,646,997 A | 7/1997 | Barton |
| 5,757,923 A | 5/1998 | Koopman, Jr. |
| 5,811,998 A | 9/1998 | Lundberg et al. |

(Continued)

FOREIGN PATENT DOCUMENTS

EP 0 849 664 A2 6/1998

(Continued)

OTHER PUBLICATIONS

Abu-Khader, Nabil, Square Root Generator for Galois Field in Multiple-Valued Logic., Recent Patents on Electrical Engineering; Sep. 2011, vol. 4 Issue 3, p. 209-213, 5p, 2 Diagrams, 3 Charts.*

(Continued)

*Primary Examiner* — David Pearson
*Assistant Examiner* — Angela Holmes
(74) *Attorney, Agent, or Firm* — Fox Rothschild, LLP; Robert J. Sacco (57) ABSTRACT

A cryptographic system (CS) comprised of generators (502), (504), (510), an encryption device (ED), and a decryption device (DD). The generator (502) generates a data sequence (DS) including payload data. The generator (504) generates an encryption sequence (ES) including random numbers. The ED (506) is configured to perform a CGFC arithmetic process. As such, the ED is comprised of a mapping device (MD) and an encryptor. The MD is configured to map the DS and ES from Galois field $GF[p^k]$ to Galois extension field $GF[p^{k+1}]$. The encryptor is configured to generate an encrypted data sequence (EDS) by combining the DS and ES utilizing a Galois field multiplication operation in Galois extension field $GF[p^{k+1}]$. The generator (510) is configured to generate a decryption sequence (DS). The DD (508) is configured to generate a decrypted data sequence by performing an inverse of the CGFC arithmetic process utilizing the EDS and DS.

20 Claims, 5 Drawing Sheets

U.S. PATENT DOCUMENTS

| | | | |
|---|---|---|---|
| 5,852,630 | A | 12/1998 | Langberg et al. |
| 5,900,835 | A | 5/1999 | Stein |
| 5,924,980 | A | 7/1999 | Coetzee |
| 5,937,000 | A | 8/1999 | Lee et al. |
| 6,014,446 | A | 1/2000 | Finkelstein |
| 6,023,612 | A | 2/2000 | Harris et al. |
| 6,038,317 | A | 3/2000 | Magliveras et al. |
| 6,078,611 | A | 6/2000 | La Rosa et al. |
| 6,141,786 | A | 10/2000 | Cox et al. |
| 6,304,216 | B1 | 10/2001 | Gronemeyer |
| 6,304,556 | B1 | 10/2001 | Haas |
| 6,314,187 | B1 * | 11/2001 | Menkhoff et al. ............. 380/28 |
| 6,331,974 | B1 | 12/2001 | Yang et al. |
| 6,377,782 | B1 | 4/2002 | Bishop et al. |
| 6,570,909 | B1 | 5/2003 | Kansakoski et al. |
| 6,614,914 | B1 | 9/2003 | Rhoads et al. |
| 6,665,692 | B1 | 12/2003 | Nieminen |
| 6,732,127 | B2 | 5/2004 | Karp |
| 6,744,893 | B1 | 6/2004 | Fleming-Dahl |
| 6,754,251 | B1 | 6/2004 | Sriram et al. |
| 6,766,345 | B2 | 7/2004 | Stein et al. |
| 6,842,479 | B2 | 1/2005 | Bottomley |
| 6,980,656 | B1 | 12/2005 | Hinton, Sr. et al. |
| 6,986,054 | B2 | 1/2006 | Kaminaga et al. |
| 6,993,016 | B1 | 1/2006 | Liva et al. |
| 7,023,323 | B1 | 4/2006 | Nysen |
| 7,027,598 | B1 | 4/2006 | Stojancic et al. |
| 7,069,492 | B2 | 6/2006 | Piret et al. |
| 7,076,065 | B2 | 7/2006 | Sherman et al. |
| 7,078,981 | B2 | 7/2006 | Farag |
| 7,079,651 | B2 | 7/2006 | Den Boer |
| 7,095,778 | B2 | 8/2006 | Okubo et al. |
| 7,133,522 | B2 | 11/2006 | Lambert |
| 7,170,997 | B2 | 1/2007 | Petersen et al. |
| 7,190,681 | B1 * | 3/2007 | Wu ............................... 370/316 |
| 7,200,225 | B1 | 4/2007 | Schroeppel |
| 7,233,969 | B2 | 6/2007 | Rawlins et al. |
| 7,233,970 | B2 | 6/2007 | North et al. |
| 7,245,723 | B2 | 7/2007 | Hinton, Sr. et al. |
| 7,269,198 | B1 | 9/2007 | Elliott et al. |
| 7,269,258 | B2 | 9/2007 | Ishihara et al. |
| 7,272,168 | B2 | 9/2007 | Akopian |
| 7,277,540 | B1 | 10/2007 | Shiba et al. |
| 7,529,292 | B2 | 5/2009 | Bultan et al. |
| 7,643,537 | B1 | 1/2010 | Giallorenzi et al. |
| 7,779,060 | B2 | 8/2010 | Kocarev et al. |
| 7,830,214 | B2 | 11/2010 | Han et al. |
| 7,853,014 | B2 | 12/2010 | Blakley et al. |
| 7,921,145 | B2 | 4/2011 | Michaels |
| 7,937,427 | B2 | 5/2011 | Chester et al. |
| 7,962,540 | B2 | 6/2011 | Michaels et al. |
| 7,970,809 | B2 | 6/2011 | Michaels et al. |
| 7,974,146 | B2 | 7/2011 | Barkley |
| 7,974,413 | B2 | 7/2011 | Chester et al. |
| 7,995,749 | B2 | 8/2011 | Michaels |
| 7,995,757 | B2 | 8/2011 | Michaels et al. |
| 2002/0012403 | A1 | 1/2002 | McGowan et al. |
| 2002/0034191 | A1 | 3/2002 | Shattil |
| 2002/0099746 | A1 | 7/2002 | Tie et al. |
| 2002/0174152 | A1 | 11/2002 | Terasawa et al. |
| 2002/0186750 | A1 | 12/2002 | Callaway et al. |
| 2003/0016691 | A1 | 1/2003 | Cho |
| 2003/0044004 | A1 | 3/2003 | Blakley et al. |
| 2004/0001556 | A1 | 1/2004 | Harrison et al. |
| 2004/0059767 | A1 | 3/2004 | Liardet |
| 2004/0092291 | A1 | 5/2004 | Legnain et al. |
| 2004/0146095 | A1 | 7/2004 | Umeno et al. |
| 2004/0156427 | A1 | 8/2004 | Gilhousen et al. |
| 2004/0196212 | A1 | 10/2004 | Shimizu |
| 2005/0031120 | A1 | 2/2005 | Samid |
| 2005/0050121 | A1 | 3/2005 | Klein et al. |
| 2005/0089169 | A1 | 4/2005 | Kim et al. |
| 2005/0207574 | A1 | 9/2005 | Pitz et al. |
| 2005/0259723 | A1 | 11/2005 | Blanchard |
| 2005/0274807 | A1 | 12/2005 | Barrus et al. |
| 2006/0072754 | A1 | 4/2006 | Hinton et al. |
| 2006/0093136 | A1 | 5/2006 | Zhang et al. |
| 2006/0123325 | A1 * | 6/2006 | Wilson et al. .................. 714/781 |
| 2006/0209926 | A1 | 9/2006 | Umeno et al. |
| 2006/0209932 | A1 | 9/2006 | Khandekar et al. |
| 2006/0251250 | A1 | 11/2006 | Ruggiero et al. |
| 2007/0121945 | A1 | 5/2007 | Han et al. |
| 2007/0230701 | A1 | 10/2007 | Park et al. |
| 2008/0008320 | A1 | 1/2008 | Hinton et al. |
| 2008/0016431 | A1 | 1/2008 | Lablans |
| 2008/0095215 | A1 | 4/2008 | McDermott et al. |
| 2008/0198832 | A1 | 8/2008 | Chester |
| 2008/0263119 | A1 | 10/2008 | Chester et al. |
| 2008/0294707 | A1 | 11/2008 | Suzuki et al. |
| 2008/0294710 | A1 | 11/2008 | Michaels |
| 2008/0294956 | A1 | 11/2008 | Chester et al. |
| 2008/0304553 | A1 | 12/2008 | Zhao et al. |
| 2008/0304666 | A1 | 12/2008 | Chester et al. |
| 2008/0307022 | A1 | 12/2008 | Michaels et al. |
| 2008/0307024 | A1 | 12/2008 | Michaels et al. |
| 2009/0034727 | A1 | 2/2009 | Chester et al. |
| 2009/0044080 | A1 | 2/2009 | Michaels et al. |
| 2009/0059882 | A1 | 3/2009 | Hwang et al. |
| 2009/0110197 | A1 | 4/2009 | Michaels |
| 2009/0122926 | A1 | 5/2009 | Azenkot et al. |
| 2009/0196420 | A1 | 8/2009 | Chester et al. |
| 2009/0202067 | A1 | 8/2009 | Michaels et al. |
| 2009/0245327 | A1 | 10/2009 | Michaels |
| 2009/0279690 | A1 | 11/2009 | Michaels et al. |
| 2009/0296860 | A1 | 12/2009 | Chester et al. |
| 2009/0300088 | A1 | 12/2009 | Michaels et al. |
| 2009/0309984 | A1 | 12/2009 | Bourgain et al. |
| 2009/0310650 | A1 | 12/2009 | Chester et al. |
| 2009/0316679 | A1 | 12/2009 | Van Der Wateren |
| 2009/0323766 | A1 | 12/2009 | Wang et al. |
| 2009/0327387 | A1 | 12/2009 | Michaels et al. |
| 2010/0054225 | A1 | 3/2010 | Hadef et al. |
| 2010/0111296 | A1 | 5/2010 | Brown et al. |
| 2010/0254430 | A1 | 10/2010 | Lee et al. |

FOREIGN PATENT DOCUMENTS

| | | |
|---|---|---|
| EP | 0 949 563 | 10/1999 |
| EP | 2 000 900 A2 | 12/2008 |
| EP | 2 000 902 A2 | 12/2008 |
| GB | 1167272 A | 10/1969 |
| JP | 2004279784 A | 10/2004 |
| WO | WO-0135572 A2 | 5/2001 |
| WO | WO-2006 110954 | 10/2006 |
| WO | WO 2008 065191 | 6/2008 |
| WO | WO-2008099367 A2 | 8/2008 |
| WO | WO-2008130973 A1 | 10/2008 |
| WO | WO 2009 146283 | 12/2009 |

OTHER PUBLICATIONS

Pirkin, Llya, Calculations in Galois Fields., C/C++ Users Journal; Oct. 2004, vol. 22 Issue 10, p. 14-18, 4p, 1 Color Photograph.*

Popescu, Angel, A Galois Theory for the Field Extension K ((X))/K., Glasgow Mathematical Journal; Sep. 2010, vol. 52 Issue 3, p. 447-451, 5p.*

Pirkin, Ilya, Calculations in Galois Fields., C/C++ Users Journal; Oct. 2004, vol. 22 Issue 10, p. 14-18, 4p, 1 Color Photograph.*

Diaz-Toca, G.M. and Lombardi, H., Dynamic Galois Theory., Journal of Symbolic Computation; Dec. 2010, vol. 45 Issue 12, p. 1316-1329, 14p.*

Abel, et al., "Chaos Communications-Principles, Schemes, and System Analysis" Proceedings for the IEEE, IEEE. New York, NY. vol. 90, No. 5, May 1, 2002, XP011064997, ISSN: 0018-9219.

Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.

Deckert, T., et al: "Throughput of WLAN with TDMA and Superimposed Transmission with Resource and Traffic Constraints" Personal, Indoor and Mobile Radio Communications, 2006 IEEE 17th Inter National Symposium on, IEEE, PI, Sep. 1, 2006, pp. 1-5, XP031023581, ISBN: 978-1-4244-0329-5.

Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004,XPOO2558039.
De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.
Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.
Knuth, D.E., "The Art of Computer Programming, Third Edition; vol. 2 Seminumerical Algorithms". Feb. 2005, Addison-Wesley, Boston 310200, XP002511903, pp. 142-146, 284-292.
Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.
Kolumban, et al., "Chaotic Communications with Correlator Receivers: Theory and Performance Limits" Proceedings of the IEEE, vol. 90, No. 5, May 2002.
Leung, et al., "Time-varying synchronization of chaotic systems in the presence of system mismatch" Physical Review E (Statistical, Nonlinear, and Soft Matter Physics) APS through AIP USA, [online] Vo. 69, No. 2, Feb. 1, 2004, pp. 26201-26211, XP002499416, ISSN: 1063-651X. Retrieved from the Internet: URL:http://prola.aps.org/pdf/PRE/v69/i2/e026201 [retrieved Oct. 13, 2008].
Manikandan, et al, "A Novel Pulse Based Ultrawide Band System Using Chaotic Spreading Sequences" Communication Systems Software and Middleware, 2007. Comsware 2007. 2nd International Conference on, IEEE, PI, Jan. 1, 2007, pp. 1-5, XP031113946 ISBN: 978-1-4244-0613-5; p. 1, p. 5.
Morsche et al., "Signals and Systems," lecture notes, University of Eindhoven, The Netherlands (1999).
Nakamura, et al, "Chaotic synchronization-based communications using constant envelope pulse" Electrical Engineering in Japan, [Online] vol. 163, No. 3, Feb. 12, 2008, pp. 47-56, XP002539977 Japan. Retrieved from the Internet: URL:http://www3.interscience.wiley.com/cgi-bin/fulltext/117910986/PDFSTART>; [retrieved on Apr. 8, 2009] p. 47-p. 48; p. 50-p. 51.
Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.
Pleszczynski, S, "On the Generation of Permutations" Information Processing Letters, Amsterdam, NL, vol. 3, No. 6, Jul. 1, 1975, pp. 180-183, XP008023810, ISSN: 0020-0190.
Pourbigharaz F. et al, Modulo-Free Architecture for Binary to Residue Transformation with Respect to (2m−1, 2m, 2m+1) Moduli Set, IEEE International Symposium on Circuits and Systems, May 30-Jun. 2, 1994, pp. 317-320, vol. 2, London, UK.
Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.
Vanwiggeren et al., "Chaotic Communication Using Time-Delayed Optical Systems" International Journal of Bifurcation and Chaos, vol. 9, No. 11 (1999), pp. 2129-2156, World Scientific Publishing Company.
Yen, et al., (1999) "Residual Number System Assisted CDMA: A New System Concept", In: ACTS'99, Jun. 8-11, 1999, Sorrento, Italy.
Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, May 6, 2001, pp. 216-216, XP01054114, ISBN: 978-0-7803-6685-5.
Michaels, et al., U.S. Appl. No. 12/496,214, filed Jul. 1, 2009, entitled "Anti-Jam Communications Having Selectively Variable Papr Including Cazac Waveform".
Michaels, et al., U.S. Appl. No. 12/507,111, filed Jul. 22, 2009, entitled "Anti-Jam Communications Using Adaptive Chaotic Spread Waveform".
Chester, et al., U.S. Appl. No. 12/480,264, filed Jun. 8, 2009, entitled "Continuous Time Chaos Dithering".
Chester, et al., U.S. Appl. No. 12/481,704, filed Jun. 10, 2009, entitled "Discrete Time Chaos Dithering".
Michaels, et al., U.S. Appl. No. 12/345,163, filed Dec. 29, 2008, entitled "Communications System Employing Chaotic Spreading Codes With Static Offsets".
Micheals, et al., U.S. Appl. No. 12/344,962, filed Dec. 29, 2008, entitled "Communications System Employing Orthogonal Chaotic Spreading Codes".
Michaels, et al., U.S. Appl. No. 12/396,828, filed Jun. 3, 2009, entitled "Communications System Employing Orthogonal Chaotic Spreading Codes".
Michaels, et al., U.S. Appl. No. 12/496,170, filed Jul. 1, 2009, entitled "Permission Based Multiple Access Communications Systems".
Michaels, et al., U.S. Appl. No. 12/496,233, filed Jul. 1, 2009, entitled "Permission-Based Secure Multiple Access Communication Systems Rotations".
Michaels, et al., U.S. Appl. No. 12/507,512, filed Jul. 22, 2009, entitled "Permission-Based TDMA Chaotic Communication Systems".
Micheals, et al., U.S. Appl. No. 12/496,085, filed Jul. 1, 2009, entitled, "High-Speed Cryptographic System Using Chaotic Sequences".
Michaels, et al., U.S. Appl. No. 12/496,123, filed Jul. 1, 2009, entitled, "Rake Receiver for Spread Spectrum Chaotic Communications Systems".
Michaels, et al., U.S. Appl. No. 12/496,146, filed Jul. 1, 2009, entitled "Improved Symbol Estimation for Chaotic Spread Spectrum Signal".
Micheals, et al., U.S. Appl. No. 12/480,316, filed Jun. 8, 2009, entitled "Symbol Duration Dithering for Secured Chaotic Communications".
Michaels, et al., U.S. Appl. No. 12/496,183, filed Jul. 1, 2009, entitled "Bit Error Rate Reduction in Chaotic Communications".
Michaels, Alan, U.S. Appl. No. 12/248,131, filed Oct. 9, 2008, entitled "Ad-Hoc Network Acquistion Using Chaotic Sequence Spread Waveform".
Michaels, Alan, U.S. Appl. No. 12/201,021, filed Aug. 29, 2008, entitled, "Multi-Tier Ad-Hoc Network Communications".
Taylor, F.J., "Residue Arithmetic a Tutorial with Examples", Computer, vol. 17, No. 5, pp. 50-62, May 1984, doi: 10.1109/MC. 1984. 1659138.
Aparicio; "Communications Systems Based on Chaos" May 2007. Universidad Rey Juan Carlos.
Bererber, S.M., et al., "Design of a CDMA Sysetm in FPGA Technology", Vehicular Technology Conference, 2007. VTC2007-Spring. IEEE 65th Apr. 22, 2007, Apr. 25, 2007, pp. 3061-3065, XP002575053 Dublin ISBN: 1-4244-0266-2 Retrieved from the Internet: URL:http://ieeexplore.ieee.org> [retrieved on Mar. 23, 2010].
Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.
El-Khamy S E: "New trends in wireless multimedia communications based on chaos and fractals" National Radio Science Conference, 2004. NRSC 2004. Proceedings of the Twenty-First Cairo, Egypt Mar. 16-18, 2004, Piscataway, NJ, USA, IEEE, Mar. 16, 2004, pp. 1-1_1, XP010715117 ISBN: 978-977-5031-77-8.
Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.
Soobul, Y., et al. "Digital chaotic coding and modulation in CDMA" IEEE AFRICON Oct. 2, 2002, Oct. 4, 2002, pp. 841-846, XP002575052 Retrieved from the Internet: URL:http://ieeexplore.ieee.org> [retrieved on Mar. 23, 2010].
Rabiner, Lawrence R., "A Tutorial on Hidden Markov Models and Selected Applications in Speech Recognition", Proceedings of the IEEE, vol. 77, No. 2, Feb. 1989.
Boyar, "Inferring Sequences Produce by Pseudo-Random Number Generators", Journal of the Associate for Computing Machine, vol. 36, No. 1, pp. 20-41, 1989.

Barile, M., "Bijective", From MathWorld-A Wolfram Web Resource, created by Eric W. Weisstein, [online] [retrieved on Nov. 8, 2010] Retrieved from the Internet: <http://mathworld.wolfram.com/Bijective.html>.
Weisstein, E., Surejection:, From MathWorld-AWolfram Web Resource [online] [retrieved on Nov. 8, 2010] Retrieved from the Internet: <http://mathworld.wolfram.com/surjection.html>.
Weisstein, E., Surejection:, From MathWorld-AWolfram Web Resource [online] [retrieved on Nov. 8, 2010] Retrieved from the Internet: http://mathworld.wolfram.com/injection.html>.
Harris Corp., International Search Report mailed Feb. 11, 2010, Application Serial No. PCT/US2009/059948.
Harris Corp., International Search Report mailed Apr. 13, 2010, Application Serial No. PCT/US2009/0069121.
Harris Corp., International Search Report mailed Apr. 13, 2010, Application Serial No. PCT/US2009/0069118.
Harris Corp., European Search Report mailed Mar. 4, 2010, Patent Application No. 08009745.4.
Barile, Margherita, "Bijective," From MathWorld-A Wolfram Web Resource, created by Eric W. Weisstein. http:// mathworld.wolfram.com/Bijective.html, Dec. 2002.
Weisstein, Eric W., "Injection," From MathWorld-A Wolfram Web Resource. http://mathworld.wolfram.com/Injection.html, Feb. 1990.
Weisstein, Eric W. "Surjection," From MathWorld-A Wolfram Web Resource, http://mathworld.wolfram.com/Surjection.html, Dec. 2002.
Michaels, Alan., et al., "Closed Galois Field Combination", U.S. Appl. No. 11/756,086, filed May 31, 2007.
U.S. Appl. No. 11/675,120, filed Feb. 15, 2007, Low Level Sequence As an Anti-Tamper Mechanism.
U.S. Appl. No. 11/751,875, filed May 22, 2007, Encryption Via Induced Unweighted Errors.
U.S. Appl. No. 11/832,160, filed Aug. 1, 2007, Chaotic Spread Spectrum Communications System Receiver.
U.S. Appl. No. 12/026,217, filed Feb. 5, 2008, Cryptographic System Incorporating a Digitally Generated Chaotic Numerical Sequence.
U.S. Appl. No. 12/056,024, filed Mar. 26, 2008, Selective Noise Cancellation of a Spread Spectrum Signal.
U.S. Appl. No. 12/117,086, filed May 6, 2008, Cryptographic System Including a Mixed Radix Number Generator With Chosen Statistical Artifacts.
U.S. Appl. No. 12/116,104, May 6, 2008, A Closed Galois Field Cryptographic System.
U.S. Appl. No. 12/131,386, filed Jun. 2, 2008, Adaptive Correlation.
U.S. Appl. No. 12/027,658, filed Feb. 7, 2008, Cryptographic System Configured to Perform a Mixed Radix Conversion With a Priori Defined Statistical Artifacts.
U.S. Appl. No. 12/137,593, filed Jun. 12, 2008, Featureless Coherent Chaotic Amplitude Modulation.
U.S. Appl. No. 12/129,197, filed May 29, 2008, Digital Generation of an Accelerated or Decelerated Chaotic Numerical Sequence.
U.S. Appl. No. 12/496,214, filed Jul. 1, 2009, Anti-Jam Communications Having Selectively Variable Peak-To-Average Power Ratio Including a Chaotic Constant Amplitude Zero Autocorrelation Waveform.
U.S. Appl. No. 12/507,111, filed Jul. 22, 2009, Adaptive Link Communications Using Adaptive.
Chaotic Spread Waveform.
U.S. Appl. No. 12/480,264, filed Jun. 8, 2009, Continuous Time Chaos Dithering.
U.S. Appl. No. 12/481,704, filed Jun. 10, 2009, Discrete Time Chaos Dithering.
U.S. Appl. No. 12/345,163, filed Dec. 29, 2008, Communications System Employing Chaotic Spreading Codes With Static Offsets.
U.S. Appl. No. 12/344,962, filed Dec. 29, 2008, Communications System Employing Orthogonal Chaotic Spreading Codes.
U.S. Appl. No. 12/396,828, filed Mar. 3, 2009, Communications System Employing Orthogonal Chaotic Spreading Codes.
U.S. Appl. No. 12/496,170, filed Jul. 1, 2009, Permission-Based Multiple Access Communications Systems.
U.S. Appl. No. 12/496,233, filed Jul. 1, 2009, Permission-Based Secure Multiple Access Communication Systems.
U.S. Appl. No. 12/507,512, filed Jul. 22, 2009, Permission-Based TDMA Chaotic Communication Systems.
U.S. Appl. No. 12/496,085, filed Jul. 1, 2009, High-Speed Cryptographic System Using Chaotic Sequences.
U.S. Appl. No. 12/496,123, filed Jul. 1, 2009, Rake Receiver for Spread Spectrum Chaotic Communications Systems.
U.S. Appl. No. 12/496,146, filed Jul. 1, 2009, Symbol Estimation for Chaotic Spread Spectrum Signal.
U.S. Appl. No. 12/480,316, filed Jun. 8, 2009, Symbol Duration Dithering for Secured Chaotic Communications.
U.S. Appl. No. 12/496,183, filed Jul. 1, 2009, Bit Error Rate Reduction in Chaotic Communications.
U.S. Appl. No. 12/248,131, filed Oct. 9, 2008, Ad-Hoc Network Acquisition Using Chaotic Sequence Spread Waveform.
U.S. Appl. No. 12/201,021, filed Aug. 29, 2008, Multi-Tier Ad-Hoc Network Communications.
U.S. Appl. No. 12/721,982, filed Mar. 11, 2010, Hidden Markov Model Detection for Spread Spectrum Waveforms.
Menezes, Vanstone, Oorschot: "Handbook of Applied Cryptography", 1997, CRC Press LLC, USA, XP002636791, p. 80-p. 85, p. 238-242.
Schneier, Bruce: "Applied Cryptography Second Edition", 1997, John Wiley & Sons, USA, XP002636792, p. 254-p. 255.
Barda, A; et al., "Chaotic signals for multiple access communications," Electrical and Electronics Engineers in Israel, 1995, Eighteenth Convention of, vol., No., pp. 2.1.3/1-2.1/3/5, Mar. 7-8, 1995.
Alia, G., et al., "A VLSI Algorithm for Direct and Reverse Conversion from Weighted Binary Number System to Residue Number System", IEEE Trans on Circuits and Systems, vol. Cas-31, No. 12, Dec. 1984.
Information about Related Patent Applications see section 6 of the accompanying Information Disclosure Statement Letter, which concerns Related Patents and Patent Applications.
International Search Report mailed Jul. 22, 2011, U.S. Appl. No. PCT/US2009/042706; Filing Date May 4, 2009, in the name of Harris Corporation.
Socek, D., et al., Short Paper: Enhanced 1-D Chaotic Key Based Algorithm for Image Encryption, Sep. 2005, IEEE.
Galias, Z., et al., "Quadrature Chaos-Shift Keying: Theory and Performance Analysis", IEEE Transactions on Circuits and Systems Part I: Regular Papers, IEEE Service Center, New York, NY US, vol. 48, No. 12, Dec. 1, 2001 XP011012427; pp. 1510-1514.
International Search Report mailed Dec. 30, 2011, European Patent Application No. 11001222.6, in the name of Harris Corporation.

* cited by examiner

CLOSED GALOIS FIELD CRYPTOGRAPHIC SYSTEM

BACKGROUND OF THE INVENTION

1. Statement of the Technical Field

The inventive arrangements relate to efficient implementations of Galois field multiplication in cryptographic systems. More particularly, the inventive arrangements relate to an efficient and invertible closed Galois field combination (CGFC) process for combining two or more input sequences in a cryptographic system.

2. Description of the Related Art

Sequence generators are used in applications ranging from signal processing, error correction codes, pseudo-random number generation and cryptographic systems. The underlying mechanism in each of these applications is a sequence that is finite in nature, with the smaller the repetition period of the sequence, the easier it is for an outsider to determine or predict the future values of the sequence. To increase the security of a sequence, most applications increase the length of the generating polynomial, use some type of nonlinear combination technique with multiple orthogonal sequences or otherwise increase the length of the sequence.

These techniques often result in significantly increasing implementation complexity, which translates into increased resource consumption and processing time. Also, for each sequence period, the generating algorithm is typically fixed and tied to a specific irreducible polynomial over a Galois field. It is also desirable to implement combination techniques such that a priori knowledge of one or more of the input sequences yields an efficient method to detect and correct sequence errors that may occur during storage or transmission.

Static examples of modification of a number sequence exist in communication systems. One such example is the Reed Solomon error correction code and derivatives thereof. The Reed Solomon error correction code computes an output value based on Galois extension field multiplications using a primitive element and a fixed irreducible polynomial.

In view of the forgoing, there remains a need for a method to combine a data stream with a random number sequence that is more computationally efficient than conventional methods. There also remains a need for a method to efficiently increase the repetition period of a random number sequence. There further remains a need for a method to combine a data stream with a random number sequence that is more resistant to errors than conventional methods.

SUMMARY OF THE INVENTION

The invention concerns a method for encrypting and decrypting a data sequence. The method involves generating a data sequence comprising payload data and an encryption sequence comprising random numbers. The random numbers can be pseudo-random numbers or pseudo-chaotic random numbers. The method also involves mapping the data sequence and the encryption sequence from a Galois field $GF[p^k]$ to a Galois extension field $GF[p^{k+1}]$. More particularly, the data sequence is mapped to the Galois extension field $GF[p^{k+1}]$ by performing an Affine transformation of the data sequence. Similarly, the encryption sequence is mapped to the Galois extension field $GF[p^{k+1}]$ by performing an Affine transformation of the encryption sequence.

The method further involves generating an encrypted data sequence by performing a CGFC arithmetic process. The CGFC arithmetic process generally involves combining the data sequence with the encryption sequence utilizing a Galois field multiplication operation in the Galois extension field $GF[p^{k+1}]$. More particularly, the CGFC arithmetic process involves combining the data sequence and the encryption sequence by selectively performing a plurality of Galois field multiplication operations using a distinct subset of digits from each of sequences.

The method also includes the step of generating a decryption sequence expressed in a Galois field $GF[p^k]$. Notably, the decryption sequence is a mathematical inversion of the encryption sequence. This inversion may be created through a calculation of the Extended Euclid Algorithm or similar process. The method further includes the step of generating a decrypted data sequence by performing an inverse of the CGFC arithmetic process utilizing the encrypted data sequence and the decryption sequence.

The invention also concerns a closed Galois field cryptographic (CGFC) system. The CGFC system is comprised of a first generator, a second generator, and an encryption device. The first generator is configured to generate a data sequence comprising payload data. The second generator is configured to generate an encryption sequence comprising pseudo random numbers or pseudo-chaotic random numbers. The encryption device is coupled to the first and second generators. The encryption device is configured to perform a CGFC arithmetic process. In this regard, it should be understood that the encryption device is comprised of a mapping device and an encryptor. The mapping device is configured to map the data sequence and the encryption sequence from a Galois field $GF[p^k]$ to a Galois extension field $GF[p^{k+1}]$. The encryptor is configured to generate an encrypted data sequence by combining the data sequence with the encryption sequence utilizing a Galois field multiplication operation in the Galois extension field $GF[p^{k+1}]$.

The CGFC system is further comprised of a third generator and a decryption device. The third generator is configured to generate a decryption sequence expressed in a Galois field $GF[p^k]$. The decryption sequence is a mathematical inversion of the encryption sequence. The inversion may be created through a calculation of the Extended Euclid Algorithm or similar process. The decryption device is coupled to the third generator. The decryption device is configured to generate a decrypted data sequence by performing an inverse of the CGFC arithmetic process utilizing the encrypted data sequence and the decryption sequence.

BRIEF DESCRIPTION OF THE DRAWINGS

Embodiments will be described with reference to the following drawing figures, in which like numerals represent like items throughout the figures, and in which.

DETAILED DESCRIPTION

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system or a computer program product. Accordingly, the present invention can take the form as an entirely hardware embodiment, an entirely software embodiment or a hardware/software embodiment.

In many communications system applications, it is desirable to have an efficient means of combining two or more number sequences. Such communications system applications include a random number generation application, an error coding application, an encryption application, a modulation application and the like. In encryption applications, the combining process is performed for masking an input data stream by some invertible operation using a number stream produced to deny determination of its generating characteristics. The term "invertible" as used herein refers to the existence of a method for undoing the masking operation and obtaining the original data stream. It is also desirable to have an efficient means of combining two (2) independent randomly generated number streams. This combining process can provide a non-linear random number stream. Non-linearly generated random number streams make it very difficult to identify generating structures. As such, some embodiments of the present invention provide a method and apparatus for efficiently combining two (2) inputs via multiplication in a Galois extension field. Such an embodiment satisfies efficiency in both time and hardware design. Such an embodiment further provides a simple nearly symmetric inverse operator.

Other embodiments of the present invention provide a method for efficiently masking data in digital hardware while making unintended decoding difficult. In this regard, it should be appreciated that such a method can be used in a variety of communications system applications. Such a method can be combined with other nonlinear or mixed-radix processing techniques to induce chosen statistical characteristics.

Figure 1:
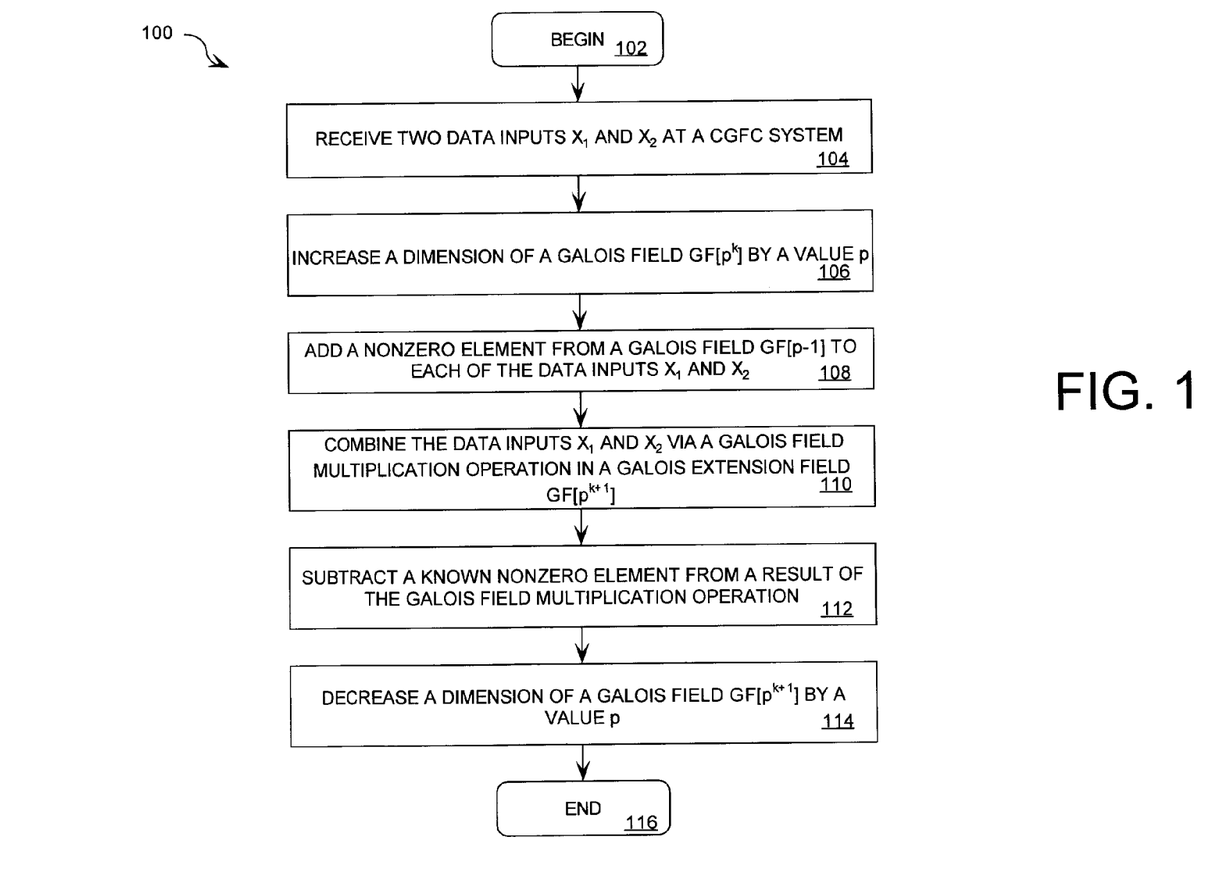
FIG. 1 is a flow chart of a closed Galois field combination (CGFC) method that is useful for understanding the invention.

Referring now to FIG. 1, there is provided a flow chart of a closed Galois field combination (CGFC) method 100 for combining two (2) data inputs. Prior to describing the CGFC method 100, a brief discussion of Galois fields is provided to assist a reader in understanding the present invention. It should be understood that the following discussion is a general discussion of the fundamental properties for a Galois field. For simplicity purposes, a complete or precise definition of a Galois field is not provided.

As should be understood, a Galois field $GF[p^k]$ is a cyclic finite structure created on a discrete collection of elements $\{0, 1, 2, \ldots, p^k-1\}$. For example, a Galois field $GF[2^3]$ is a cyclic finite structure containing elements $\{0, 1, 2, 3, 4, 5, 6, 7\}$. The Galois field $GF[p^k]$ has certain analytical properties that allow arithmetic operations to be performed within the Galois field $GF[p^k]$. Such arithmetic operations include an addition operation, a subtraction operation, and a multiplication operation. The Galois field $GF[p^k]$ is often referred to as a closed structure since results of said arithmetic operations equal another element in the same Galois field. The arithmetic operations may be viewed as modular arithmetic. For example, if the Galois field $GF[p^k]$ is selected as a Galois field $GF[7^1]$, then the modular arithmetic for selected elements can be defined as follows: $2-4=-1\cdot7+5=5$ mod 7; $5+6=11=1\cdot7+4=4$ mod 7; and $5\cdot6=30=4\cdot7+2=2$ mod 7.

An arithmetic operation of division in the Galois field $GF[p^k]$ requires a definition of unique multiplicative inverses. More generally, division by a number in Galois field $GF[p^k]$ is more properly equivalent to a multiplication by said number's inverse. This notional division operation is only possible if a multiplicative inverse exists. For example, if the Galois field $GF[p^k]$ is selected as a Galois field $GF[11]$, then the modular arithmetic for selected elements can be defined as follows: $4\cdot3=12=1$ mod 11. In such a scenario, four (4) is the multiplicative inverse of three (3) in Galois field $GF[11]$. Similarly, three (3) is the multiplicative inverse of four (4) in Galois field $GF[11]$.

As should be understood, the notional arithmetic operation of division in the Galois field $GF[p^k]$ is only valid for elements that result in a nonzero value when reduced modulo p. For example, if the Galois field $GF[p^k]$ is selected as a Galois field $GF[2^3]$, then the modular arithmetic for elements zero (0) and X is defined as follows: $0\cdot X=0\equiv0$ mod 8. X is any element of Galois field $GF[2^3]$. In such a scenario, there does not exist a multiplicative inverse of zero (0) within the Galois field $GF[2^3]$. As such, a multiplication of element zero (0) times another element of Galois field $GF[2^3]$ can not be inverted to obtain one (1) of the two (2) elements multiplied together. Notably, there also does not exist a multiplicative inverse for the even numbered elements $\{0, 2, 4, 6\}$ within the Galois field $GF[2^3]$. More generally, there does not exist a multiplicative inverse for any even numbered elements in a Galois field $GF[2^k]$. Even more generally, in a Galois field $GF[p^k]$ it is true that only numbers that are not divisible by the prime characteristic p will have unique inverses.

Referring again to FIG. 1, the present invention provides a CGFC method 100 for bypassing the above-described shortcomings of Galois field multiplication. The present invention also provides a CGFC method 100 which ensures the existence of a multiplicative inverse and subsequently an invertible cryptographic operation. Generally, the method involves performing an Affine transformation on any plurality of k-bit p-adic data streams. The resulting data streams can be efficiently and invertibly combined by a means of Galois field multiplication in a Galois field $GF[p^{k+1}]$. The Affine transformation yields additional degrees of freedom which expands the variability of output values and thereby makes reverse engineering of the k-bit data streams more difficult. As will be appreciated by those skilled in the art, Affine transformations generally involve a linear transformation along with a non-zero additive constant. In an exemplary embodiment of binary systems (p=2), the affine transformation is a linear multiplication by two (2) along with an addition of one (1) to the end of a digital word or removing a one (1) from the end of a digital word.

The following example is provided in order to further illustrate an Affine transformation. The scope of the present invention, however, is not to be considered limited in any way thereby.

EXAMPLE 1

Let p equal two (2) and k equal three (3). A simple Affine transformation from a Galois field $GF[8]$ to a Galois field $GF[16]$ is performed by appending a one (1) behind a least significant bit (LSB) of each three (3) bit representation of numbers in the Galois field $GF[8]$. The Affine transformation yields $0\to1$, $1\to3$, $2\to5$, $3\to7$, $4\to9$, $5\to11$, $6\to13$, and $7\to15$. Each number in the extended Galois field has a unique multiplicative inverse. Explicitly, $1^{-1}$ mod $16\equiv1, 3^{-1}$ mod $16\equiv11$, $5^{-1}$ mod $16\equiv13$, $7^{-1}$ mod $16\equiv7$, $9^{-1}$ mod $16\equiv9$, $11^{-1}$ mod $16\equiv3$, $13^{-1}$ mod $16\equiv5$, and $15^{-1}$ mod $16\equiv15$. The Affine transformation from the Galois field $GF[16]$ to the Galois field $GF[8]$ is performed as $(y-1)/2$, where y is the result of the Galois field $GF[16]$ multiplication. The Affine transformation from the Galois field $GF[2^k]$ to the Galois field $GF[2^{k+1}]$ always yields an odd value. The result of the Galois field $GF[2^{k+1}]$ multiplication y is always odd. y−1 is always even. The Affine transformation from the Galois field $GF[2^{k+1}]$ to the Galois field $GF[2^k]$ is simply accomplished by dropping the least significant bit (LSB) from y and keeping the k most significant bits.

Referring again to FIG. 1, the CGFC method 100 begins at step 102 and continues with step 104. In step 104, two data inputs $X_1$ and $X_2$ are received at a closed Galois field combination system. The closed Galois field combination system can be, but is not limited to, a closed Galois field encryption system such as that described below in relation to FIG. 5. Thereafter, step 106 is performed where a dimension of a Galois field $GF[p\ k]$ is increased by a value p. After step 106, step 108 is performed where a nonzero element from a Galois field $GF[p]$ is added to each of the data inputs $X_1$ and $X_2$. It should be noted that steps 106 and 108 collectively provide an Affine transformation between an original number range to a number range of a Galois extension field. The Affine transformation can be selected as a constant function or a function of time. Affine transformations are well known to persons skilled in the art, and therefore will not be described in detail herein. However, it should be understood that an Affine transformation may be considered a bijective mapping. Bijective, injective, and surjective mappings are also well known to persons skilled in the art, and therefore will not be described herein.

In step 110, the two data inputs are combined via a Galois field multiplication operation in a Galois extension field $GF[p^{k+1}]$. The Galois field multiplication operation is performed to guarantee invertible reconstruction of the data inputs $X_1$ and $X_2$. This invertible operation is desirable such that a first data input $X_1$ can be obtained via a pre-defined mathematical process and a priori knowledge of a second data input $X_2$.

After step 110, the CGFC method 100 continues with a step 112. In step 112, a known digit is subtracted from a result of said Galois field multiplication operation. In step 114, a dimension of a Galois field $GF[p^{k+1}]$ is decreased by a value p. Collectively, steps 112, 114 perform an Affine transformation that is the inverse of the original Affine transformation performed in steps 106, 108. Subsequently, step 116 is performed where the CGFC method 100 ends.

Referring again to step 110 of FIG. 1, a brief discussion of the rationale and mechanics of multiplication in a Galois field is provided to assist a reader in understanding the present invention. It should be noted that the scope of the present invention is not to be considered limited in any way thereby.

As should be understood, multiplication of two (2) numbers in a Galois field results in another number within the same Galois field. The multiplication process may not be invertible, even given knowledge of one of the original numbers since the other number may not have a multiplicative inverse. For example, the multiplication of the numbers two (2) and four (4) in a Galois field GF[8] yields a number zero (2×4≡0 modulo 8). If the output value of zero (0) and an input value is known, then the other input value can not be reconstructed since the numbers two (2) or four (4) do not have a multiplicative inverse in a Galois field GF[8]. More generally, the multiplication process is non-invertible for some values in a Galois field GF[8].

The solution to guaranteed invertible multiplication is to restrict the numbers being multiplied to those which have multiplicative inverses in a given Galois field. This restriction places additional requirements on the random number generator to either produce acceptable numbers or else to map outputs to acceptable numbers. One method of implementing a structure such that all elements have unique inverses is to increase the dimension of the original Galois field, mapping the initial number set to a distinct invertible subset of the extended Galois field. The Galois field having an increased dimension is referred to herein as a Galois extension field. It can be shown that there exists an injective mapping between the elements in the original Galois field and those in the Galois extension field that possess multiplicative inverses. This invertability allows a unique multiplication of numbers in the original Galois field through the injective mapping, implementing an effective bijective mapping.

EXAMPLE 2

As an example, compare the direct (non-invertible) multiplication of elements in a Galois field $GF[3^2]$ with the (invertible) multiplications of the same elements when projected upon a subset of the Galois extension field $GF[3^3]$. The elements in the Galois field $GF[3^2]$ are provided in the following Table 1. The elements in the Galois field $GF[3^3]$ are provided in the following Table 2. It should be noted that the numbers in Tables 1 and 2 are represented in 2-digit 3-adic representation.

TABLE 1

BASIC TIMES TABLE FOR $3^2$, USING DIRECT MULTIPLICATION

|    | 00 | 01 | 02 | 10 | 11 | 12 | 20 | 21 | 22 |
|----|----|----|----|----|----|----|----|----|----|
| 00 | 00 | 00 | 00 | 00 | 00 | 00 | 00 | 00 | 00 |
| 01 | 00 | 01 | 02 | 10 | 11 | 12 | 20 | 21 | 22 |
| 02 | 00 | 02 | 11 | 20 | 22 | 01 | 10 | 12 | 21 |
| 10 | 00 | 10 | 20 | 00 | 10 | 20 | 00 | 10 | 20 |
| 11 | 00 | 11 | 22 | 10 | 21 | 02 | 20 | 01 | 12 |
| 12 | 00 | 12 | 01 | 20 | 02 | 21 | 10 | 22 | 11 |
| 20 | 00 | 20 | 10 | 00 | 20 | 10 | 00 | 20 | 10 |
| 21 | 00 | 21 | 12 | 10 | 01 | 22 | 20 | 11 | 02 |
| 22 | 00 | 22 | 21 | 20 | 12 | 11 | 10 | 02 | 01 |

TABLE 2

TIMES TABLE FOR $3^2$ USING GALOIS EXTENSION FIELD WITH NONZERO ELEMENTS 1

|    | 00 | 01 | 02 | 10 | 11 | 12 | 20 | 21 | 22 |
|----|----|----|----|----|----|----|----|----|----|
| 00 | 00 | 01 | 02 | 10 | 11 | 12 | 20 | 21 | 22 |
| 01 | 01 | 12 | 00 | 11 | 22 | 10 | 21 | 02 | 20 |
| 02 | 02 | 00 | 21 | 12 | 10 | 01 | 22 | 20 | 11 |
| 10 | 10 | 11 | 12 | 20 | 21 | 22 | 00 | 01 | 02 |
| 11 | 11 | 22 | 10 | 21 | 02 | 20 | 01 | 12 | 00 |
| 12 | 12 | 10 | 01 | 22 | 20 | 11 | 02 | 00 | 21 |
| 20 | 20 | 21 | 22 | 00 | 01 | 02 | 10 | 11 | 12 |
| 21 | 21 | 02 | 20 | 01 | 12 | 00 | 11 | 22 | 10 |
| 22 | 22 | 20 | 11 | 02 | 00 | 21 | 12 | 10 | 01 |

It should be noted that the multiplication results shown in the first row and column of Table 1 are always zero (00). This result implies that the values are non-invertible. Further, the statistical distribution of the output sequence, given two uniformly random input sequences, will be skewed such that 21/81 outputs are equal to zero (00) thereby eliminating the desired uniform distributions. Table 2 displays a perfectly uniformly distributed set of outputs whenever the inputs are also uniformly distributed. Given an input value and an output value, we can reconstruct the other input uniquely. This invertible property is most easily seen from the fact that each output value occurs only once in each row or column of Table 2.

It should be noted that Galois field multiplication is more computationally efficient than the equivalent multiplication in a weighted number system since the number of output values is restricted to a finite set. The phrase "weighted number system" as used herein refers to a number system other than a residue number system.

It should also be noted that Galois field multiplication in binary number systems such as a Galois field $GF[2^k]$ are useful in practice due to the structure of digital logic. Computational savings for Galois field multiplication in digital hardware as compared to conventional multiplications exceed fifty percent (50%). Algorithms for effecting the Galois field multiplication operation are well known to those skilled in the art, and therefore will not be described herein. In general, the multiplication result in a Galois field may be obtained more efficiently since only partial information of the intermediate arithmetic steps is required to determine the unique output value.

It should further be noted that combining two (2) numbers via Galois field multiplication results in the masking of the two (2) numbers whenever there is no knowledge of the same. This property is desirable in numerous encryption applications. This property is also comparable to combination techniques that combine two (2) numbers through a bit-wise XOR (exclusive or) logical operation except that each digit in the individual input sequence values has a larger effect on the other digits in the output value. The bit-wise XOR logical operation can be viewed as a special case of Galois extension field multiplication for a Galois field $GF[2^1]$, where a number maps to its own multiplicative inverse in the Galois extension field $GF[2^2]$ using Affine transformations $f(x)=2x+1$ and $f^{-1}(x)=(x-1)/2$.

Figure 2:
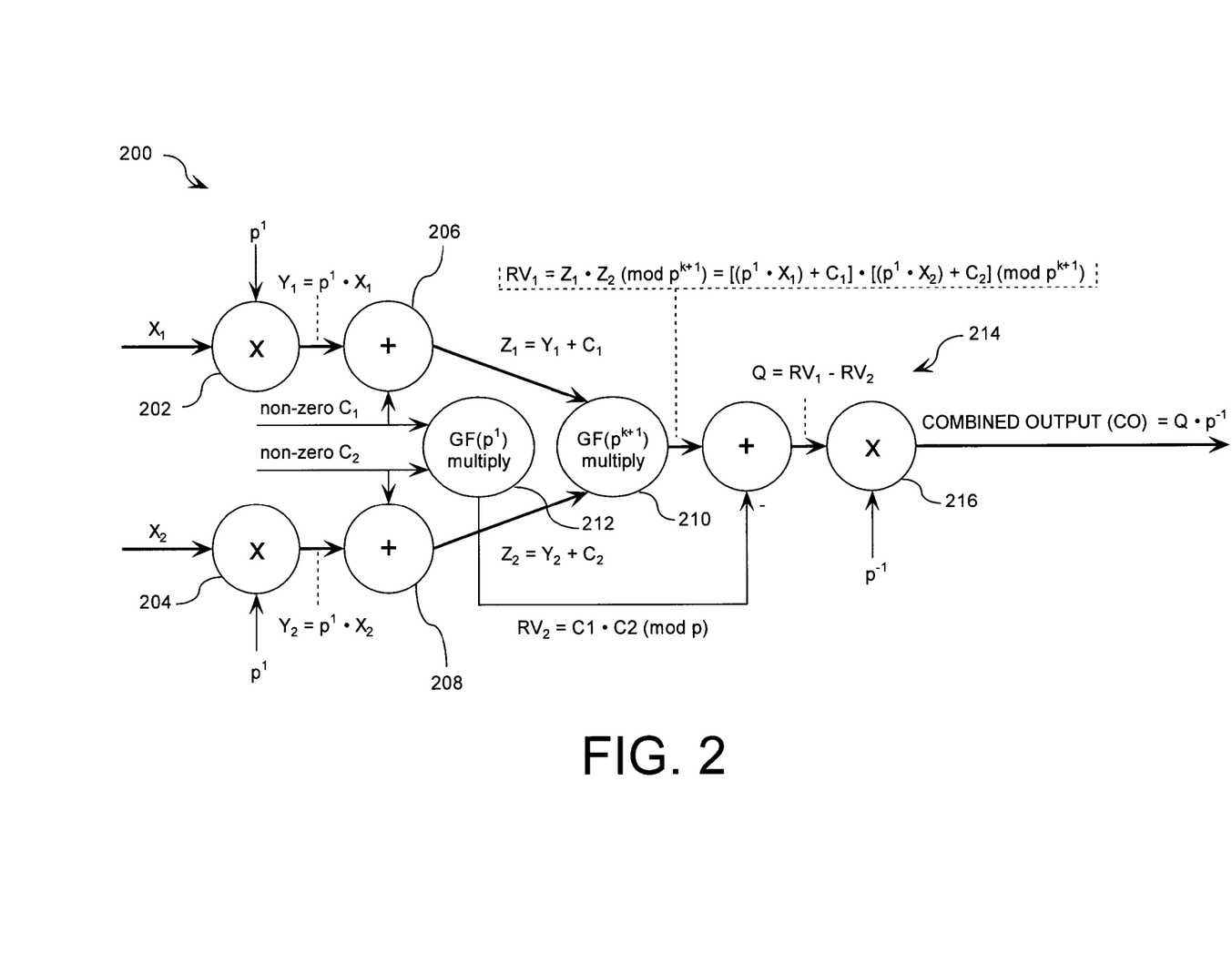
FIG. 2 is a diagram of a CGFC arithmetic process that is useful for understanding the invention.

Referring now to FIG. 2, the above described CGFC method 100 can be further defined by a CGFC arithmetic process 200. The CGFC arithmetic process 200 begins with data inputs $X_1$ and $X_2$. The data input $X_1$ can be payload data or a random number of a random number sequence. The data input $X_2$ can be a pseudo-random number of a pseudo-random number sequence or a pseudo-chaotic random number of a pseudo-chaotic random number sequence. The phrase "payload data" as used herein refers to data that is a numerical equivalent to a written symbol of a natural language, such as a letter or a punctuation mark. For example, if a number three (3) is a numerical equivalent to a letter C, then the data input $X_1$ has a value of three (3). The data input can also be the numerical equivalent for data of any type using a predefined coding process.

The data inputs $X_1$, $X_2$ are expressed as a member of the Galois field $GF[p^k]$ of dimension $p^k$. According to an embodiment of the invention, the data inputs $X_1$, $X_2$ are expressed in a Galois field with a power of two (2) dimension, i.e., a Galois field $GF[2^k]$ representation. In such a scenario, the manipulation of elements of the Galois field $GF[2^k]$ in binary arithmetic is trivial.

The data inputs $X_1$, $X_2$ are expressed in a p-adic number representation or a mixed-radix number system representation. The p-adic number representation and mixed-radix number systems are well known to persons skilled in the art, and therefore will not be described in detail herein. However, it should be appreciated that a p-adic representation is an extension of the natural numbers based on the divisibility of integers by powers of a number p. As two common examples, the commonly used decimal system uses a 10-adic representation and a binary system uses a 2-adic representation. This p-adic representation can also be viewed as the natural representation of a weighted number system, where digits in the p-adic representation correspond to the powers of a number p.

The phrase "natural number" as used herein refers to the set of positive integers greater than zero (0). In practice p is greater then and equal to two (p>2) since the value of p equal to one (p=1) contains no capacity for information. The extension of the field of natural numbers results in a p-adic number sequence. The p-adic number sequence is comprised of k elements $(x_0, x_1, \ldots, x_{k-1})$ of residue $x_k$ modulo p.

It is notable that the p-adic number representation of a weighted number system $GF[p^k]$ is isomorphic to the k-length composite $GF[p] \cdot GF[p] \cdot \ldots \cdot GF[p]$. Any operator that is bijective on the weighted number system may also be viewed as bijective on the k-length composite. Operating on a p-adic word as a weighted number system induces a correlation between elements, while operating on the k independent fields of size p remains independent at the output. The first case is much more difficult to decode if one or more of the data inputs is unknown.

As shown in FIG. 2, the initial multiplication operations 202, 204 and addition operations 206, 208 are performed using the data inputs $X_1$, $X_2$. These operations 202, 204, 206, 208 are performed to increase a size of the finite or Galois field $GF[p^k]$ from $p^k$ to $p^{k+1}$ via an Affine transformation. p is taken to be an arbitrary prime number chosen based on the p-adic representation of the data inputs. Still, the invention is not limited in this regard. The products of the multiplication operations 202, 204 are herein after referred to as $Y_1$ and $Y_2$. The products $Y_1$, $Y_2$ are defined by mathematical Equations (1-2).

$$Y_1 = X_1 \cdot p^1 \tag{1}$$

$$Y_2 = X_2 \cdot p^1 \tag{2}$$

where $Y_1$ and $Y_2$ are products obtained via a multiplication operation 202, 204.

Subsequently, the addition operations 206, 208 are performed to add non-zero constants $C_1$, $C_2$ from a finite or Galois field $GF[p^1]$ to each product $Y_1$, $Y_2$. The non-zero constants $C_1$, $C_2$ have a value of $1, 2, \ldots$, or $p-1$. These addition operations 206, 208 complete the input Affine transformations and assure the existence of inverses of the data inputs $X_1$, $X_2$. It should be appreciated that if p=2 and the arithmetic operations 206, 208 are performed in binary arithmetic then the Affine transformation is a simple appending of a binary one (1) to the right of a least significant bit (LSB) of the data input $X_1$, $X_2$ thus implementing 2X+1 as one (1) is the only nonzero element in a Galois field GF[2].

The results of the addition operations 206, 208 are hereinafter referred to as $Z_1$ and $Z_2$. The results $Z_1$, $Z_2$ are defined by mathematical Equations (3-4).

$$Z_1 = Y_1 + C_1(X_1 \cdot p^1) + C_1 \tag{3}$$

$$Z_2 = Y_2 + C_2(X_2 \cdot p^1) + C_2 \tag{4}$$

where $Z_1$ and $Z_2$ are results of addition operations. $Y_1$ and $Y_2$ are products obtained via multiplication operations 202, 204. $C_1$ and $C_2$ are nonzero constants selected from a finite or Galois field GF[p]. Equivalently, $C_1$ and $C_2$ may be chosen as unrestricted constants selected from a finite or Galois field GF[p-1], and additively increased by the value one (1). $X_1$ and $X_2$ are data inputs expressed as RNS residue values, p-adic number system representations, or mixed-radix number system representations. p is a prime number constant defining a finite field size of a Galois field GF[p].

Thereafter, a Galois field multiplication 210 is performed using the results $Z_1$, $Z_2$. This Galois field multiplication 210 is performed to combine the data inputs $X_1$, $X_2$ in an expanded Galois field $GF[p^{k+1}]$. The result of the Galois field multiplication 210 is defined by mathematical Equation (5).

$$RV_1 = Z_1 \cdot Z_2 (\text{mod } p^{k+1}) = [(X_1 \cdot p^1) + C_1] \cdot [(X_2 \cdot p^1) + C_2] \quad (\text{mod } p^1) \quad (5)$$

where $RV_1$ is a result of the Galois field multiplication 210. $p^{k+1}$ is a modulus having a value defined by the size of the extended Galois field $GF[p^{k+1}]$. It should be understood that when two elements from a Galois field $GF[p^{k+1}]$ are multiplied the product is another element within that Galois field $GF[p^{k+1}]$. In effect, a finite structure size is maintained while a multiplication operation is being performed using the results $Z_1$, $Z_2$. For example, if $p^{k+1}$ is selected to have a value of sixteen (16) and the product $Z_1$, $Z_2$ results in a value of forty-five (45), then the result of the arithmetic operation forty-five modulo sixteen (45 modulo 16) equals thirteen (13). The value thirteen (13) is an element in the finitely many invertible elements $\{1, 3, \ldots, 15\}$ of the Galois extension field $GF[16]$.

As shown in FIG. 2, the nonzero constants $C_1$, $C_2$ are combined together via Galois field multiplication 212. This Galois field $GF[p^1]$ multiplication 212 is performed to combine the nonzero constants $C_1$, $C_2$ in Galois field $GF[p^1]$. The result of the Galois field multiplication 212 can be defined by mathematical Equation (6).

$$RV_2 = C_1 \cdot C_2 (\text{mod } p) \quad (6)$$

where $RV_2$ is a value representing the nonzero constants $C_1$, $C_2$. p is a modulus having a prime number value defining a finite field size of a Galois field $GF[p]$. In the case of p equal to two (p=2) and $C_1$ times $C_2$ equals one ($C_1 = C_2 = C_1 \cdot C_2 = 1$), there is no need to perform this multiplication 212 in a Galois extension field since multiplicative inverses will always exist for both data inputs $X_1$, $X_2$.

As shown in FIG. 2, $(RV_1 - RV_2) \cdot p^{-1}$ is computed to perform an Affine transformation 214 from a Galois field $GF[p^{k+1}]$ to a Galois field $GF[p^k]$. The Affine transformation 214 includes subtracting $RV_2$ from $RV_1$ to obtain a result Q. This subtraction operation is performed in $GF[p^{k+1}]$. The result Q can be defined by a mathematical Equation (7).

$$Q = RV_1 - RV_2 \quad (7)$$

Thereafter, the difference Q is combined with a multiplicative inverse of p via a multiplication operation 216 to obtain a combined output (CO). The combined output can be defined by mathematical Equation (8).

$$CO = Q \cdot p^{-1} \quad (8)$$

where Q is a result obtained from subtracting $RV_2$ from $RV_1$. $p^{-1}$ is the multiplicative inverse of the prime p, considered in a weighted number system.

The overall CGFC arithmetic process 200 can be generally defined by a mathematical Equation (9).

$$CO = \frac{[(p \cdot X_1 + C_1) \cdot (p \cdot X_2 + C_2)](\text{mod } p^{k+1}) - C_1 \cdot C_2 (\text{mod } p)}{p} \quad (9)$$

where p is a prime number constant defining a finite field size of a Galois field $GF[p^m]$. $X_1$ and $X_2$ are data inputs expressed as values in a p-adic number system representation or a mixed-radix number system representation. $C_1$ and $C_2$ are nonzero values selected from a Galois field $GF[p]$. $p^{k+1}$ is a number value defining a finite field size of a Galois field $GF[p^{k+1}]$. It should be noted that for p equal to two (p=2) all products in the extended Galois field $GF[2^{k+1}]$ are odd. Therefore, the operation defined in mathematical Equation (8) can be performed simply in binary arithmetic by truncating the k+1 bit result of the modulo $2^{k+1}$ multiply $RV_1$ to the k most significant bits (MSBs). More generally, the least significant bit (LSB) is removed from the result of subtracting $RV_2$ from $RV_1$.

Referring again to FIG. 2, a method of extending the repetition period of a random number sequence can be easily constructed. Given two (2) random number sequences as inputs $X_1$ and $X_2$ that come from pseudo-random number generators with mutually prime repetition periods, the output numerical sequence will be a nonlinear combination that yields another pseudo-random number sequence with a repetition period equal to the product of the input repetition periods. The method described in this paragraph extends trivially to the combination of larger numbers of random number generators since multiplication inside a Galois field is associative. In this context, the "associative" property refers to the ability to reorder inputs to an arithmetic process in any combination, resulting in the same output. Note that the CGFC arithmetic process 200 (described above in relation to FIG. 2) as a whole is associative.

It should be understood that the CGFC arithmetic process 200 can be modified in accordance with an encoding process. In such a scenario, the data input $X_1$ can be a number from a numerical sequence representing data. $X_2$ can be a number from a coding sequence. The coding sequence can be, but is not limited to, a pseudo-random number sequence or a pseudo-chaotic random number sequence. An example of such a modified CGFC arithmetic process 200 is provided in FIG. 3.

Figure 3:
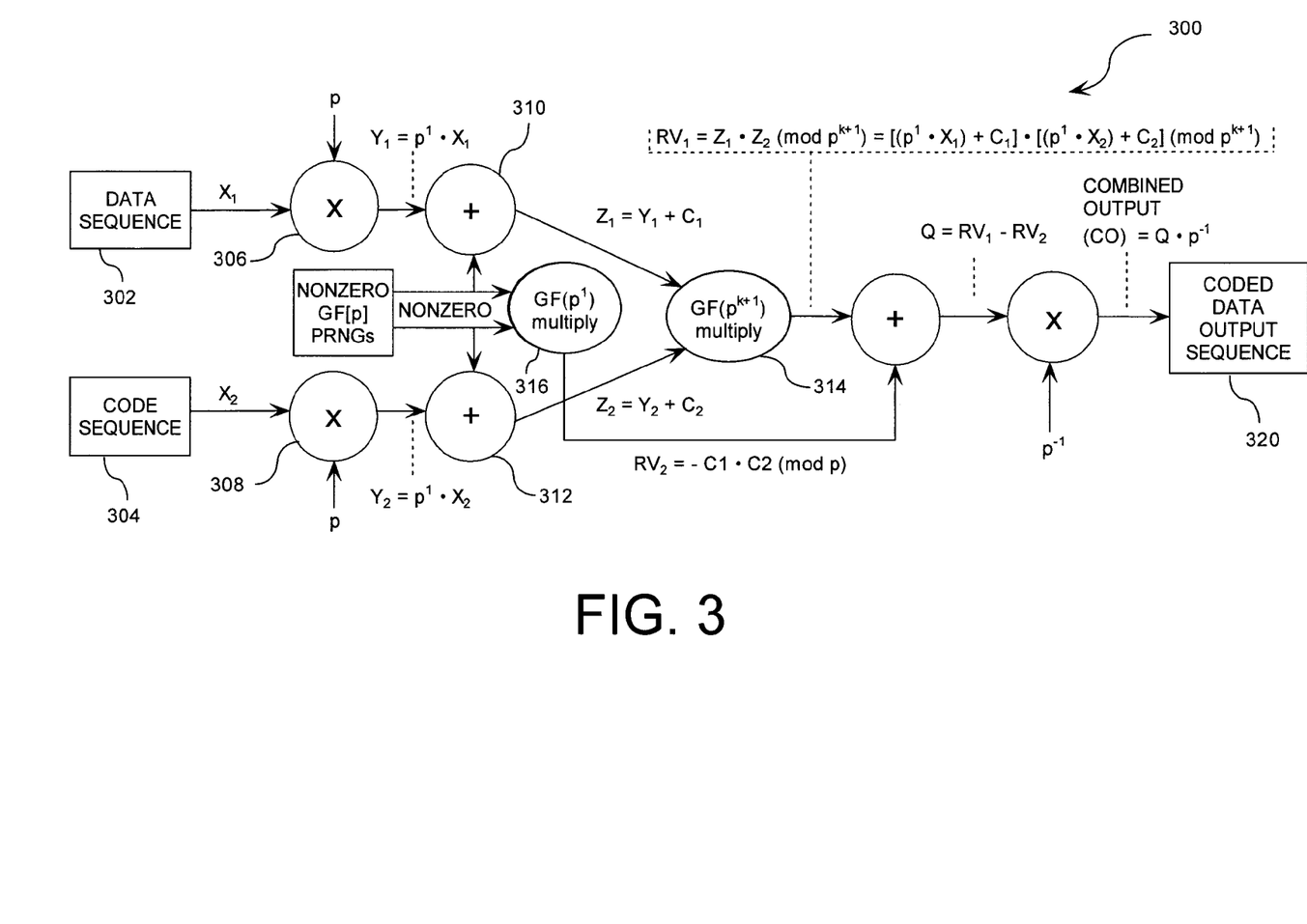
FIG. 3 is a diagram of a CGFC arithmetic process for encoding data that is useful for understanding the invention.

Referring now to FIG. 3, a block diagram of a CGFC arithmetic process 300 for encoding data is provided. It should be understood that the CGFC arithmetic process 300 may be used in conjunction with other processes to create stream ciphers or other coding algorithms. Such structures include, but are not limited to, feedback loops, scrambling, and mixed-radix operations.

As shown in FIG. 3, each value of a data sequence 302 is combined with a value of a code sequence 304 through a Galois extension field multiplication 314 (described above in relation to FIG. 1 and FIG. 2). It should be noted that the data sequence 302 and/or the code sequence 304 can be selected to have a known mathematical relationship. The data sequence 302 and the code sequence 304 can also be comprised of two or more digits expressed in a weighted number system. In such a scenario, the data sequence 302 and the code sequence 304 can be combined by selectively performing a Galois extension field multiplication 314 using a distinct subset of digits from each sequence 302, 304.

It should be noted that the dynamic range of the code sequence 304 values is assumed to be greater than or equal to that of the data sequence 302 values. As used herein, the phrase "dynamic range" refers to the number of possible values for a number or a measurement. The dynamic range is equivalent to a cardinality of a set of possible input values when the code generator does not operate on a subcycle.

It should also be noted that the code sequence 304 may be formed from a truncated or random selection of values generated by one or more random number generators. Random number generators are well known to persons skilled in the art, and therefore will not be described in detail herein. The coded data output sequence 320 of the encoding process 300 represents a block of encoding or encryption cipher on the data sequence 302 values using the coded sequence 304 values.

It should further be noted that a nearly symmetric method for decoding the coded data output sequence 320 exists. A decoding process can be performed to obtain the data sequence 302 from the combined output coded data sequence 320. Such an inverse CGFC arithmetic process is described below in FIG. 4.

Figure 4:
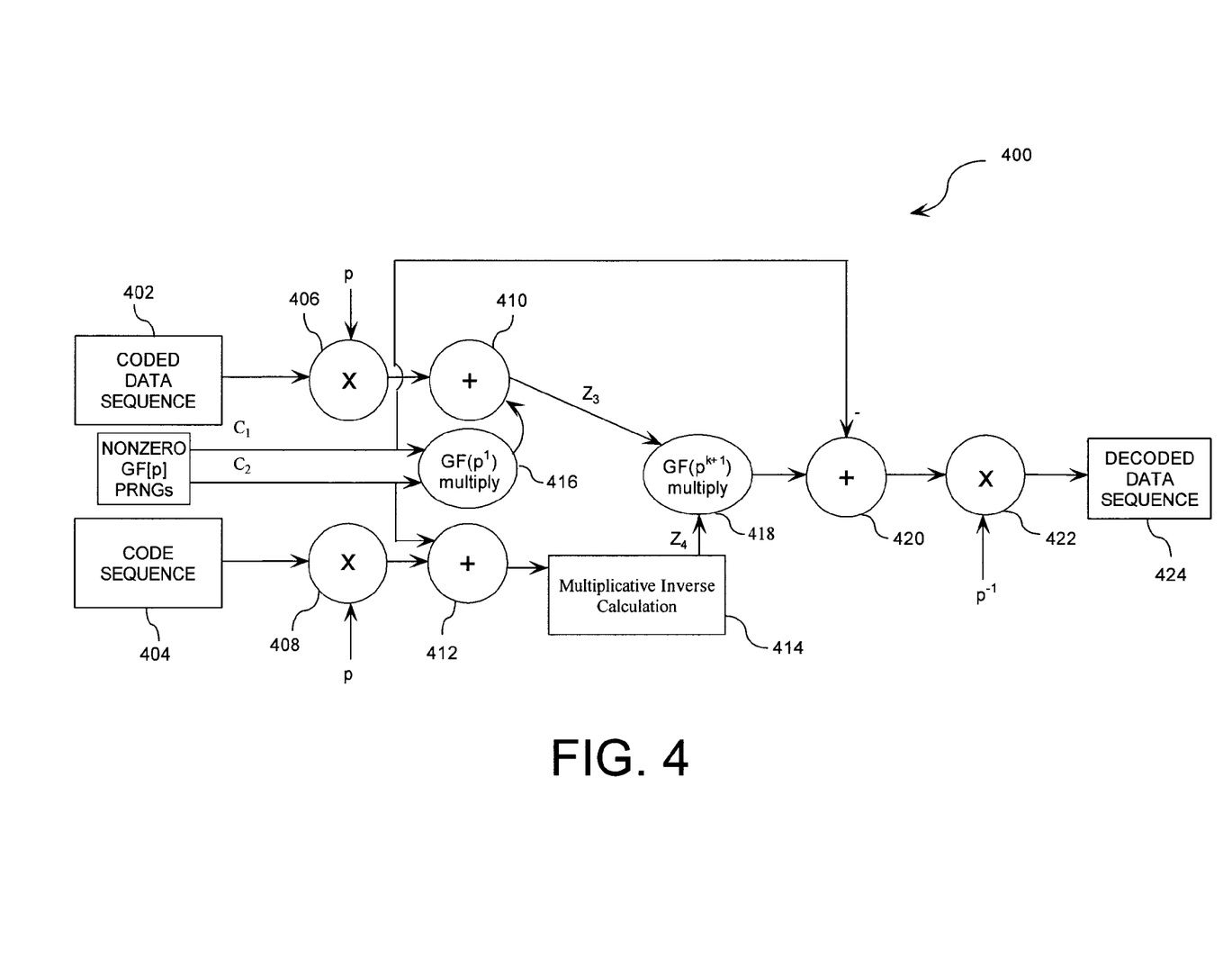
FIG. 4 is a diagram of a CGFC arithmetic process for decoding data that is useful for understanding the invention.

Referring now to FIG. 4, a first input sequence 402 is the coded data output sequence 320 developed in the encoding process 300 (described above in relation to FIG. 3.). A second input sequence 404 is a synchronized replica of the code sequence 304 utilized in the encoding process 300. An "inverse" operation 414 on this code sequence 404 referring to a bijective mapping from the original code sequence 304 values to the unique multiplicative inverse of the post-Affine transformation code sequence values inside the same Galois extension field that is used for the combination step. This inverse operation is calculated on a value by value basis. The inverse operation may be implemented using any combination of arithmetic processes, digital logic, lookup tables or software. Efficient methods to locate a multiplicative inverse inside residue number systems are well known to those skilled in the art, and therefore will not be described in detail herein. However, it should be noted that one common method for determining the multiplicative inverse inside a Galois field is via an Extended Euclidean algorithm. The Extended Euclidean algorithm is well known to persons skilled in the art, and will not be described in detail herein.

Given the code sequence 404, the decoding process 400 follows a modified combination technique to the CGFC arithmetic process 200 (described above in relation to FIG. 2). In this regard, it should be appreciated that the decoding process 400 includes multiplications operations 406, 408 and addition operations 410, 412. The decoding process 400 also includes a Galois extension field multiplication operation 416 and a Galois field multiplication operation 418. The decoding process further includes an addition operation 420 and a multiplication operation 422. The output sequence 424 of the decoding process 400 is identical to original data sequence 302 of FIG. 3.

Table 3 presents all of the encoded and decoded values possible from the data and code sequences if the Galois field GF[8] follows the flows shown in FIG. 3 and FIG. 4. It should be appreciated that the table heading "Data Sequence from a First Data Source" refers to values of the Data Sequence 302 of FIG. 3. The table heading "Code Sequence from a Second Data Source" refers to values of the Code Sequence 304 of FIG. 3. The table heading "First Data Source Affine Transformation" refers to the value of $Z_1$ produced by the multiplication and addition operations 306, 310 of FIG. 3. The table heading "Second Data Source Affine Transformation" refers to the value of $Z_2$ produced by the multiplication and addition operations 308, 312 of FIG. 3. The table heading "GF[16] Result" refers to the intermediate result $RV_1$ of FIG. 3. The table heading "GF[8] Result" refers to the intermediate result CO of FIG. 3. The table heading "1/Data Source 2 in GF[16]" refers to the intermediate result $Z_4$ of FIG. 4. The table heading "GF[8] Decoded Data" refers to the decoded data sequence 424 of FIG. 4. It should be noted that in this binary (p=2) example, the arbitrary nonzero value that is appended to each of the values is always one (1). It should also be noted that the decoding step requires multiplication by the multiplicative inverse of the random sequence rather than the sequence value itself.

TABLE 3

| Data Sequence from a First Data Source | Code Sequence from a Second Data Source | First Data Source Affine Trans. | Second Data Source Affine Trans. | GF[16] Result | GF[8] Result | 1/Data Source 2 in GF[16] | GF[8] Decoded Data |
|---|---|---|---|---|---|---|---|
| 0 | 0 | 1 | 1 | 1 | 0 | 1 | 0 |
| 0 | 1 | 1 | 3 | 3 | 1 | 11 | 0 |
| 0 | 2 | 1 | 5 | 5 | 2 | 13 | 0 |
| 0 | 3 | 1 | 7 | 7 | 3 | 7 | 0 |
| 0 | 4 | 1 | 9 | 9 | 4 | 9 | 0 |
| 0 | 5 | 1 | 11 | 11 | 5 | 3 | 0 |
| 0 | 6 | 1 | 13 | 13 | 6 | 5 | 0 |
| 0 | 7 | 1 | 15 | 15 | 7 | 15 | 0 |
| 1 | 0 | 3 | 1 | 3 | 1 | 1 | 1 |
| 1 | 1 | 3 | 3 | 9 | 4 | 11 | 1 |
| 1 | 2 | 3 | 5 | 15 | 7 | 13 | 1 |
| 1 | 3 | 3 | 7 | 5 | 2 | 7 | 1 |
| 1 | 4 | 3 | 9 | 11 | 5 | 9 | 1 |
| 1 | 5 | 3 | 11 | 1 | 0 | 3 | 1 |
| 1 | 6 | 3 | 13 | 7 | 3 | 5 | 1 |
| 1 | 7 | 3 | 15 | 13 | 6 | 15 | 1 |
| 2 | 0 | 5 | 1 | 5 | 2 | 1 | 2 |
| 2 | 1 | 5 | 3 | 15 | 7 | 11 | 2 |
| 2 | 2 | 5 | 5 | 9 | 4 | 13 | 2 |
| 2 | 3 | 5 | 7 | 3 | 1 | 7 | 2 |
| 2 | 4 | 5 | 9 | 13 | 6 | 9 | 2 |
| 2 | 5 | 5 | 11 | 7 | 3 | 3 | 2 |
| 2 | 6 | 5 | 13 | 1 | 0 | 5 | 2 |
| 2 | 7 | 5 | 15 | 11 | 5 | 15 | 2 |
| 3 | 0 | 7 | 1 | 7 | 3 | 1 | 3 |
| 3 | 1 | 7 | 3 | 5 | 2 | 11 | 3 |
| 3 | 2 | 7 | 5 | 3 | 1 | 13 | 3 |
| 3 | 3 | 7 | 7 | 1 | 0 | 7 | 3 |
| 3 | 4 | 7 | 9 | 15 | 7 | 9 | 3 |
| 3 | 5 | 7 | 11 | 13 | 6 | 3 | 3 |
| 3 | 6 | 7 | 13 | 11 | 5 | 5 | 3 |
| 3 | 7 | 7 | 15 | 9 | 4 | 15 | 3 |
| 4 | 0 | 9 | 1 | 9 | 4 | 1 | 4 |
| 4 | 1 | 9 | 3 | 11 | 5 | 11 | 4 |
| 4 | 2 | 9 | 5 | 13 | 6 | 13 | 4 |

TABLE 3-continued

| Data Sequence from a First Data Source | Code Sequence from a Second Data Source | First Data Source Affine Trans. | Second Data Source Affine Trans. | GF[16] Result | GF[8] Result | 1/Data Source 2 in GF[16] | GF[8] Decoded Data |
|---|---|---|---|---|---|---|---|
| 4 | 3 | 9 | 7 | 15 | 7 | 7 | 4 |
| 4 | 4 | 9 | 9 | 1 | 0 | 9 | 4 |
| 4 | 5 | 9 | 11 | 3 | 1 | 3 | 4 |
| 4 | 6 | 9 | 13 | 5 | 2 | 5 | 4 |
| 4 | 7 | 9 | 15 | 7 | 3 | 15 | 4 |
| 5 | 0 | 11 | 1 | 11 | 5 | 1 | 5 |
| 5 | 1 | 11 | 3 | 1 | 0 | 11 | 5 |
| 5 | 2 | 11 | 5 | 7 | 3 | 13 | 5 |
| 5 | 3 | 11 | 7 | 13 | 6 | 7 | 5 |
| 5 | 4 | 11 | 9 | 3 | 1 | 9 | 5 |
| 5 | 5 | 11 | 11 | 9 | 4 | 3 | 5 |
| 5 | 6 | 11 | 13 | 15 | 7 | 5 | 5 |
| 5 | 7 | 11 | 15 | 5 | 2 | 15 | 5 |
| 6 | 0 | 13 | 1 | 13 | 6 | 1 | 6 |
| 6 | 1 | 13 | 3 | 7 | 3 | 11 | 6 |
| 6 | 2 | 13 | 5 | 1 | 0 | 13 | 6 |
| 6 | 3 | 13 | 7 | 11 | 5 | 7 | 6 |
| 6 | 4 | 13 | 9 | 5 | 2 | 9 | 6 |
| 6 | 5 | 13 | 11 | 15 | 7 | 3 | 6 |
| 6 | 6 | 13 | 13 | 9 | 4 | 5 | 6 |
| 6 | 7 | 13 | 15 | 3 | 1 | 15 | 6 |
| 7 | 0 | 15 | 1 | 15 | 7 | 1 | 7 |
| 7 | 1 | 15 | 3 | 13 | 6 | 11 | 7 |
| 7 | 2 | 15 | 5 | 11 | 5 | 13 | 7 |
| 7 | 3 | 15 | 7 | 9 | 4 | 7 | 7 |
| 7 | 4 | 15 | 9 | 7 | 3 | 9 | 7 |
| 7 | 5 | 15 | 11 | 5 | 2 | 3 | 7 |
| 7 | 6 | 15 | 13 | 3 | 1 | 5 | 7 |
| 7 | 7 | 15 | 15 | 1 | 0 | 15 | 7 |

Closed Galois Field Cryptographic System

It should be understood that conventional cryptographic systems typically require an asymmetric encryption or decryption processing technique implemented in digital hardware. The phrase "asymmetric processing" as used herein refers to a significant difference in time, processing structure, or computational resources required to perform associated operations. This asymmetric encryption or decryption processing technique can limit many ciphers functionality and applicability. For example, an RSA algorithm involves selecting public and private keys for encrypting data. This selection typically makes decrypting a message by an intended user far easier than an encryption step by a messenger. The digital hardware typically includes a relatively large number of digital logic gates. As such, the conventional cryptographic systems have a relatively high power consumption and relatively long data processing time. Encryption methods that permit symmetric processing permit design re-use of hardware as well as more flexibility in function and applicability.

Embodiments of a closed Galois field (CGF) cryptographic system (e.g., shown in FIG. 5) provides a symmetric encryption and decryption processing technique implemented in digital hardware. The phrase "symmetric processing" as used herein refers to an ability to both encrypt and decrypt a message using a substantially similar processing structure, time and resources. In effect, the embodiment of the CGF cryptographic system has a relatively short data processing time as compared to conventional cryptographic systems. The embodiments of the CGF cryptographic system also have relatively low power consumption as compared to conventional cryptographic systems due to the efficient combination means.

Figure 5:
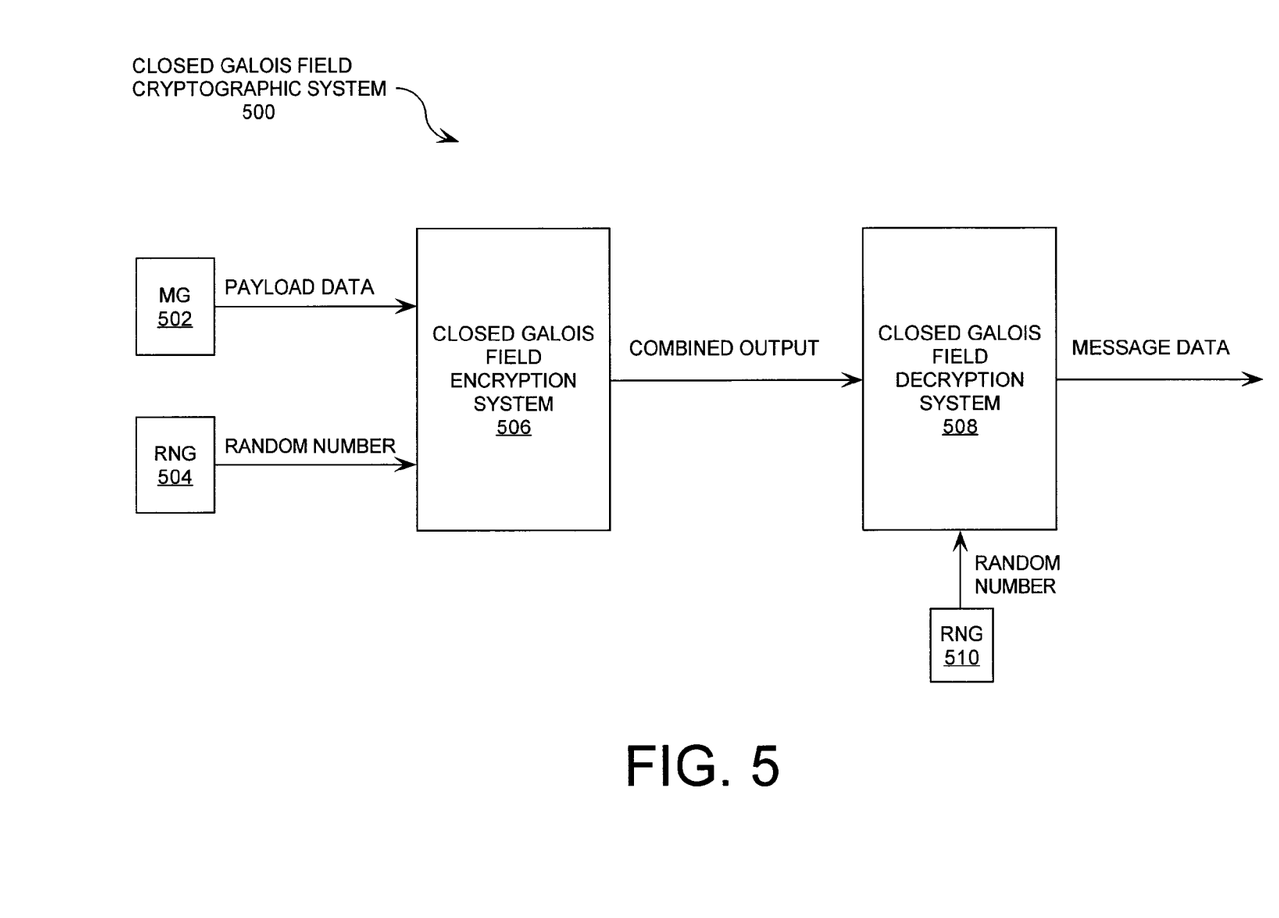
FIG. 5 is a block diagram of a closed Galois field cryptographic system that is useful for understanding the invention.

Referring now to FIG. 5, there is illustrated one embodiment of a closed Galois field (CGF) cryptographic system 500 which could be used to implement the inventive arrangements. The CGF cryptographic system 500 is comprised of a message generator 502 and random number generators (RNGs) 504, 510. The CGF cryptographic system 500 is also comprised of a closed Galois field (CGF) encryption system 506 and a closed Galois field (CGF) decryption system 508. The message generator 502 is comprised of hardware and software configured to generate payload data. The message generator 502 is also comprised of hardware and software configured to perform operations for expressing payload data in a block format. The message generator 502 is further comprised of hardware and software configured to communicate payload data to the CGF encryption system 506.

The RNG 504 is comprised of hardware and software configured to generate an encryption sequence. The encryption sequence can be comprised of linearly or nonlinearly generated pseudo-random numbers or pseudo-chaotic random numbers. The RNG 504 is also comprised of hardware and software configured to communicate a random number sequence to the CGF encryption system 506.

The CGF encryption system 506 is comprised of hardware and software configured to receive payload data from the message generator 502 and an encryption sequence from the RNG 504. The CGF encryption system 506 is also comprised of hardware and software configured to implement and perform a CGFC method 100 (described above in relation to FIG. 1) and a CGFC arithmetic process 300 (described above in relation to FIG. 3) for encrypting payload data using the random number sequence. The CGF encryption system 506 is further comprised of hardware and software configured to communicate a combined output to the CGF decryption system 508.

The RNG 510 is comprised of hardware and software configured to generate a decryption sequence. The decryption sequence can be comprised of linearly or nonlinearly generated pseudo-random numbers or pseudo-chaotic random numbers. The decryption sequence can be an inverted sequence based on the encryption sequence generated by the RNG 504. The RNG 510 is also comprised of hardware and software configured to perform data block formatting. The RNG 510 is further comprised of hardware and software configured to communicate a decryption sequence to the CGF decryption system 508.

The CGF decryption system 508 is comprised of hardware and software configured to receive a combined output from the CGF encryption system 506 and a decryption sequence from the RNG 510. The CGF decryption system 508 is also comprised of hardware and software configured to implement and perform an inverse CGFC arithmetic process 400 (described above in relation to FIG. 4) for decrypting payload data. The CGF decryption system 508 is further comprised of hardware and software configured to communicate message data to an external device (not shown).

In light of the foregoing description of the invention, it should be recognized that the present invention can be realized in hardware, software, or a combination of hardware and software. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or an FPGA could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Additionally, the description above is intended by way of example only and is not intended to limit the present invention in any way, except as set forth in the following claims.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. A method for encrypting a data sequence, comprising the steps of:

generating, by an electronic circuit, a payload data sequence comprising a plurality of first digits expressed as members of a Galois field $GF[p^k]$;

generating, by an electronic circuit, an encryption sequence comprising a plurality of second digits expressed as members of said Galois field $GF[p^k]$;

mapping, by an electronic circuit, said payload data sequence and said encryption sequence from said Galois field $GF[p^k]$ to a Galois extension field $GF[p^{k+1}]$, said mapping achieved by performing a first Affine transformation using said plurality of first digits and a second Affine transformation using said plurality of second digits; and generating, by an electronic circuit, an encrypted data sequence by performing a CGFC arithmetic process, said CGFC arithmetic process including combining first results of said first Affine transformation with second results of said second Affine transformation;

wherein said first results and said second results are combined using a Galois field multiplication operation in said Galois extension field $GF[p^{k+1}]$, where p is a prime number, k is an integer value, and $p^{k+1}$ defines a finite field size of said Galois extension field $GF[p^{k+1}]$.

2. The method according to claim 1, further comprising selecting random numbers of said encryption sequence to be pseudo-random numbers or pseudo-chaotic random numbers.

3. The method according to claim 1, further comprising expressing said data sequence and said encryption sequence in a p-adic number system representation or a mixed-radix number system representation.

4. The method according to claim 1, further comprising selecting each of said data sequence and said encryption sequence to be comprised of at least two digits expressed in a weighted number system.

5. The method according to claim 1, further comprising combining said data sequence and said encryption sequence by selectively performing a plurality of Galois field multiplication operations using a distinct subset of digits from each of said data sequence and said encryption sequence.

6. The method according to claim 1, further comprising generating a decryption sequence comprising random numbers and expressed in a Galois field $GF[p^k]$.

7. The method according to claim 6, further comprising selecting said random numbers of said decryption sequence to be pseudo-random numbers or pseudo-chaotic random numbers.

8. The method according to claim 6, wherein said decryption sequence is an inverted sequence based on said encryption sequence.

9. The method according to claim 6, generating a decrypted data sequence by performing an inverse of said CGFC arithmetic process utilizing said encrypted data sequence and said decryption sequence.

10. A device comprising a machine-readable non-transitory medium, having stored thereon a computer program for data communication, the computer program having a plurality of code sections, the code sections executable by a processor to cause the processor to perform the steps of:

generating a payload data sequence comprising a plurality of first digits expressed as members of a Galois field $GF[p^k]$;

generating an encryption sequence comprising a plurality of second digits expressed as members of said Galois field $GF[p^k]$;

mapping said payload data sequence and said encryption sequence from said Galois field $GF[p^k]$ to a Galois extension field $GF[p^{k+1}]$, said mapping achieved by performing a first Affine transformation using said plurality of first digits and a second Affine transformation using a plurality of second digits; and generating an encrypted data sequence by performing a CGFC arithmetic process, said CGFC arithmetic process including combining first results of said first Affine transformation with second results of said second Affine transformation;

wherein said first results and said second results are combined using a Galois field multiplication operation in said Galois extension field $GF[p^{k+1}]$, where p is a prime number, k is an integer value, and $p^{k+1}$ defines a finite field size of said Galois extension field $GF[p^{k+1}]$.

11. The device according to claim 10, further comprising instructions to cause the processor to combine said data sequence and said encryption sequence by selectively performing a plurality of Galois field multiplication operations using a distinct subset of digits from each of said data sequence and said encryption sequence.

12. The device according to claim 10, further comprising instructions to cause the process to receive a signal comprising said encrypted data sequence and generate a decryption sequence comprising random numbers and expressed in said Galois field $GF[p^k]$ subsequent to receiving said signal.

13. The device according to claim 12, further comprising instructions to cause the processor to generate a decrypted data sequence by performing an inverse of said CGFC arithmetic process utilizing said encrypted data sequence and said decryption sequence.

14. A closed Galois field cryptographic (CGFC) system, comprising:

a first generator configured to generate a payload data sequence comprising a plurality of first digits expressed as members of a Galois field $GF[p^k]$;

a second generator configured to generate an encryption sequence comprising a plurality of second digits expressed as members of a Galois field $GF[p^k]$; and an encryption device coupled to said first and second generators and configured to perform a CGFC arithmetic process, said encryption device comprising (a) a mapping device configured to map said payload data sequence and said encryption sequence from said Galois field $GF[p^k]$ to a Galois extension field $GF[p^{k+1}]$, said mapping achieved by performing a first Affine transformation using said plurality of first digits and a second Affine transformation using said plurality of second digits, and (b) an encryptor configured to generate an encrypted data sequence by combining first results of said first Affine transformation with second results of said second Affine transformation;

wherein said first results and said second results are combined using a Galois field multiplication operation in said Galois extension field $GF[p^{k+1}]$, where p is a prime number, k is an integer value, $p^k$ is defines a finite field size of said Galois field $GF[p^k]$, and $p^{k+1}$ defines a finite field size of said Galois extension field $GF[p^{k+1}]$.

15. The CGFC system according to claim 14, wherein said encryptor is further configured to combine said data sequence and said encryption sequence by selectively performing a plurality of Galois field multiplication operations using a distinct subset of digits from each of said data sequence and said encryption sequence.

16. The CGFC system according to claim 14, wherein said encryption sequence is a pseudo random number sequence or a pseudo-chaotic random number sequence.

17. The CGFC system according to claim 14, further comprising a third generator configured to generate a decryption sequence expressed in a Galois field $GF[p^k]$.

18. The CGFC system according to claim 17, wherein said decryption sequence is comprised of pseudo-random numbers or pseudo-chaotic random numbers.

19. The CGFC system according to claim 17, wherein said decryption sequence is an inverted sequence based on said encryption sequence.

20. The CGFC system according to claim 17, further comprising a decryption device coupled to said third generator and configured to generate a decrypted data sequence by performing an inverse of said CGFC arithmetic process utilizing said encrypted data sequence and said decryption sequence.

* * * * *